(No Model.)
T. F. BRILES.
HINGE FOR GATES.
No. 328,282. Patented Oct. 13, 1885.
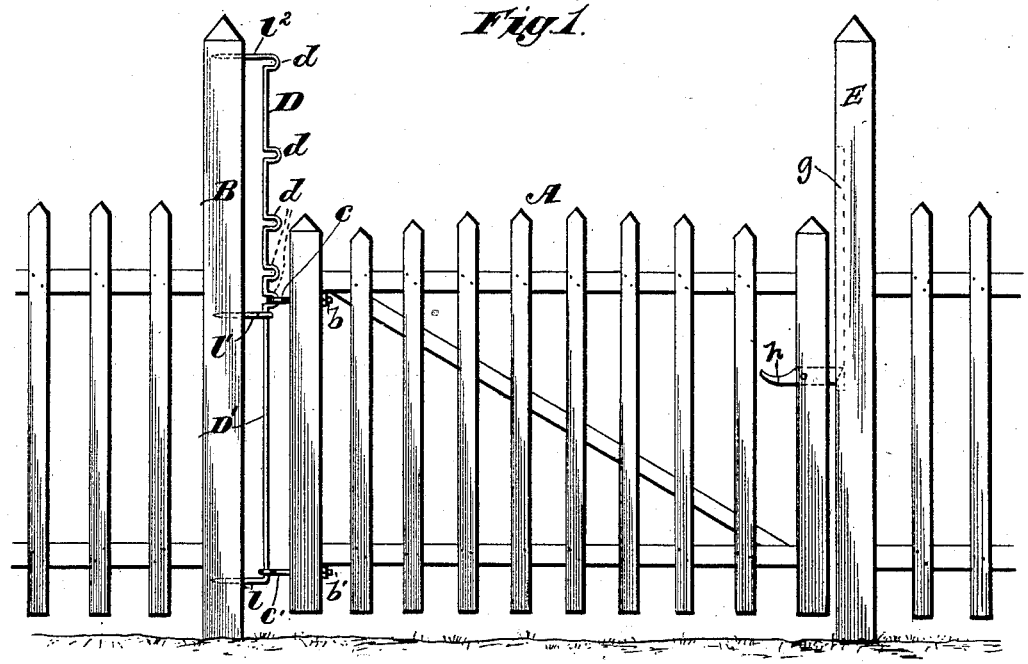
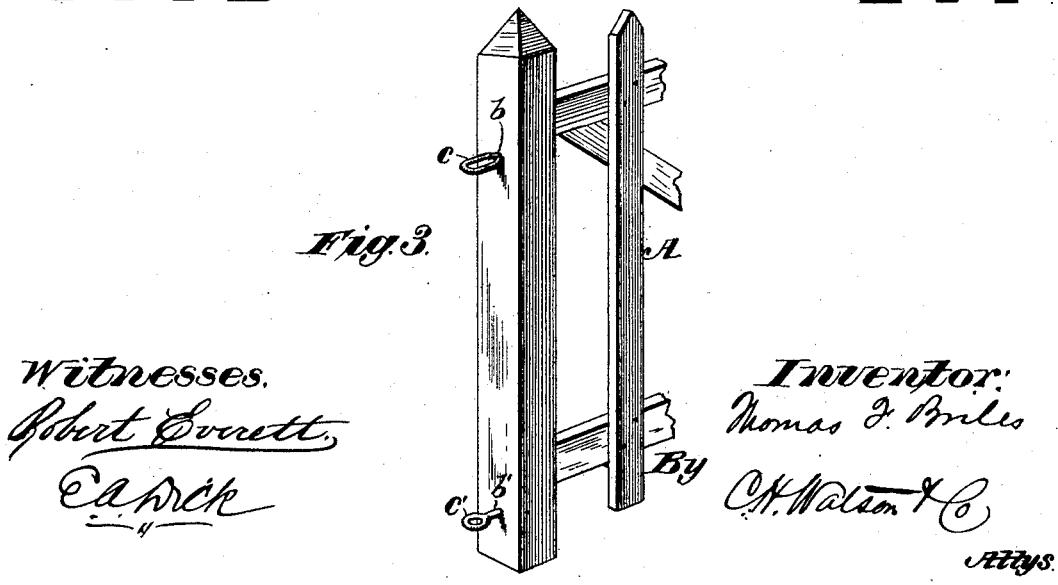
Witnesses.
Robert Everett,
E. A. Dick
Inventor:
Thomas F. Briles
By C. H. Watson & Co.
Attys.

UNITED STATES PATENT OFFICE.

THOMAS F. BRILES, OF BROWNSVILLE, MISSOURI.

HINGE FOR GATES.

SPECIFICATION forming part of Letters Patent No. 328,282, dated October 13, 1885.

Application filed April 4, 1885. Serial No. 161,223. (No model.)

*To all whom it may concern:*

Be it known that I, THOMAS F. BRILES, of Brownsville, in the State of Missouri, have invented certain new and useful Improvements in Hinges for Gates; and I do hereby declare that the following is a full, clear, and exact description of the invention, which will enable others skilled in the art to which it appertains to make and use the same, reference being had to the accompanying drawings, and to the letters of reference marked thereon, which form a part of this specification.

This invention has relation to improvements in hinges for gates.

The object of my invention is to provide a hinge which can be attached to a gate-post and the gate connected thereto, so that the said gate may be readily raised upward on the hing to any desired height as may be required.

The invention consists in the novel construction and arrangement of parts, as will be hereinafter described, and particularly pointed out in the claims.

In the accompanying drawings, Figure 1 is a side elevation of my improvement. Fig. 2 is a top plan view of the same. Fig. 3 is an enlarged detail.

The letter A represents the gate, having at its rear edge bolts $b\ b'$, provided with eyes $c\ c'$, the former made in oblong shape.

D designates my improved hinge, having integral therewith arms $l$ and $l^2$, provided with drive-points which are secured to the post B. The hinge is also provided at its central portion with an eyebolt, $l'$, secured to said post, to support and prevent the hinge from bending. The hinge is also provided on its face portion, between the arm $l^2$ and eyebolt $l'$, with a series of notches, $d$, ranging in distances from below upward from two to twelve inches apart. Below the eyebolt $l'$ is a straight portion, D', of the hinge, for a purpose hereinafter described.

The operation of my invention is as follows: To raise the gate, the oblong eye $c$ of the bolt $b$ is detached from the lower notch of the hinge, and the gate is raised upward, the eye $c'$ of the bolt $b'$ sliding on the straight portion D' of the hinge, whereby the eye $c$ can be raised to engage any desired notch, as occasion may require.

The post E is provided with a groove, $g$, extending from its central portion to near its top, in which is engaged a latch, $h$, pivoted to the gate. This groove is so arranged in connection with the hinge that when the gate is raised upward from one notch to the other the latch will keep the gate closed.

I attach importance to the fact that in the construction of my improved hinge I am enabled to adjust the gate upward on said hinge, for the purpose of avoiding snow-drifts and other obstructions. I can also separate small animals from larger ones and allow them to pass to or from the field under the gate by the construction of my hinge; and, further, if the gate or post should "sag" I can raise the gate to the second notch of the hinge, to prevent the bottom portion of said gate from coming in contact with the ground.

I wish it to be understood that I do not confine myself to the precise location of the notches of the hinge, as I may place them closer together or farther apart, should occasion require it.

I deem the eyebolt arranged centrally on the hinge and connected to the post an important element of my invention, for in constructing the hinge in one piece the said eyebolt prevents the hinge from bending by the weight of the gate when said gate is opened, or moved upward or downward on the hinge; and I am not aware that such construction of hinge has been heretofore used with a central eyebolt arranged thereon for the purpose above set forth.

Having thus described my invention and the operation thereof, what I claim is—

1. The combination, with the post and gate, of a hinge made in one piece and having its ends bent at right angles thereto to form drive-points, its body portion evenly divided to form notches and straight portions, and a bolt arranged centrally on said hinge and secured to the post, whereby said central bolt prevents the weight of the gate from bending the hinge, as shown and described.

2. The combination, with the post and gate, of a hinge made in one piece, one half of which is provided with notches, its other half having a straight portion, said hinge also provided at its ends with arms having drive-points, and its middle portion provided with an eyebolt secured to said post, whereby the hinge is prevented from being bent by the weight of the gate, as shown and described.

3. An adjustable gate-hinge having at each end of its body drive-points, its central portion provided with an eyebolt, said hinge above the eyebolt provided with notches and below said eyebolt a straight portion, and the eyebolts $c\ c'$, the former of which has an eye of oblong shape, and the latter one of annular form, as shown and described.

In testimony that I claim the foregoing as my own I have hereto affixed my signature in presence of two witnesses.

THOMAS F. BRILES.

Witnesses:
BENJ. F. LOUD,
FRANK BRIGHT.